(12) United States Patent
Li et al.

(10) Patent No.: US 11,223,382 B2
(45) Date of Patent: Jan. 11, 2022

(54) UPLINK CARRIER AGGREGATION DEVICE AND MOBILE TERMINAL

(71) Applicant: VIVO MOBILE COMMUNICATION CO., LTD., Guangdong (CN)

(72) Inventors: Tianlin Li, Guangdong (CN); Zhimin Lu, Guangdong (CN)

(73) Assignee: VIVO MOBILE COMMUNICATION CO., LTD.

(*) Notice: Subject to any disclaimer, the term of this patent is extended or adjusted under 35 U.S.C. 154(b) by 0 days.

(21) Appl. No.: 16/969,239

(22) PCT Filed: Jan. 25, 2019

(86) PCT No.: PCT/CN2019/073170
§ 371 (c)(1),
(2) Date: Aug. 12, 2020

(87) PCT Pub. No.: WO2019/154128
PCT Pub. Date: Aug. 15, 2019

(65) Prior Publication Data
US 2021/0006280 A1    Jan. 7, 2021

(30) Foreign Application Priority Data
Feb. 12, 2018    (CN) .......................... 201810145860.2

(51) Int. Cl.
*H04L 5/12* (2006.01)
*H04B 1/40* (2015.01)
(Continued)

(52) U.S. Cl.
CPC ................ *H04B 1/40* (2013.01); *H04B 1/04* (2013.01); *H04B 1/1615* (2013.01); *H04L 5/001* (2013.01); *H04B 2001/0408* (2013.01)

(58) Field of Classification Search
CPC .. H04B 1/04; H04B 2001/0408; H04B 1/006; H04B 2001/0416; H04B 2001/045;
(Continued)

(56) References Cited

U.S. PATENT DOCUMENTS

2011/0195670 A1* 8/2011 Dakshinamurthy ... H04B 17/12
455/73
2011/0241773 A1   10/2011 Fisk et al.
(Continued)

FOREIGN PATENT DOCUMENTS

CN    102725817 A    10/2012
CN    203368478 U    12/2013
(Continued)

OTHER PUBLICATIONS

International Preliminary Report on Patentability dated Aug. 27, 2020 issued in PCT/CN2019/073170.
(Continued)

*Primary Examiner* — Zewdu A Kassa
(74) *Attorney, Agent, or Firm* — Gearhart Law LLC; David Postolski

(57) ABSTRACT

A ULCA device and a mobile terminal are provided. The ULCA device includes an RF transceiver, at least two PAs, one power-amplifier power module, a control chip, a multiplexer, and an antenna switch. The RF transceiver is connected to the at least two PAs. The at least two PAs are connected to the multiplexer, which is connected to the antenna switch. The control chip is connected to the RF transceiver and the power-amplifier power module, and configured to determine supply voltage needed by each PA, determine target voltage to be output by the power-amplifier power module based on maximum supply voltage, and send a power supply instruction to the power-amplifier power module. The power-amplifier power module is connected to
(Continued)

the at least two PAs, and configured to regulate the target voltage according to the power supply instruction and output the target voltage to the at least two PAs.

15 Claims, 3 Drawing Sheets

(51) Int. Cl.
*H04B 1/04* (2006.01)
*H04B 1/16* (2006.01)
*H04L 5/00* (2006.01)

(58) Field of Classification Search
CPC ...... H04B 1/1607; H04B 1/0458; H04B 1/06; H04B 1/00; H04B 1/02; H04B 1/0483; H04B 17/20; H04B 1/1615
USPC ........ 375/262, 261, 260, 259, 219, 316, 295
See application file for complete search history.

(56) References Cited

U.S. PATENT DOCUMENTS

| | | | |
|---|---|---|---|
| 2012/0082043 | A1 | 4/2012 | Hwang et al. |
| 2014/0266429 | A1* | 9/2014 | Khlat .................. H03F 1/02 330/130 |
| 2016/0380652 | A1 | 12/2016 | Anthony et al. |
| 2021/0006280 | A1 | 1/2021 | Li et al. |

FOREIGN PATENT DOCUMENTS

| | | |
|---|---|---|
| CN | 105450189 A | 3/2016 |
| CN | 108390691 A | 8/2018 |

OTHER PUBLICATIONS

Extended European Search Report dated Feb. 24, 2021 issued in PCT/CN2019/073170.

* cited by examiner

UPLINK CARRIER AGGREGATION DEVICE AND MOBILE TERMINAL

CROSS-REFERENCE TO RELATED APPLICATION

The present application is a U.S. national phase application of PCT Application No. PCT/CN2019/073170 filed on Jan. 25, 2019, which claims priority to Chinese patent application No. 201810145860.2 filed in China on Feb. 12, 2018, the disclosures of which are incorporated herein by reference in entirety.

TECHNICAL FIELD

The present disclosure relates to the field of communication technology, in particular to an uplink (UL) carrier aggregation (CA) device and a mobile terminal.

BACKGROUND

With rapid development of mobile communication technology and popularization of mobile terminals, mobile terminals are used all the time for information communication over communication networks. Mobile communication applications, such as online video chat, online film and video viewing, and online webcasting, have been ubiquitous in daily life, and accordingly, the requirement on data transfer rate in mobile communication has been increasingly higher.

The $4^{th}$ generation (4G) Long Term Evolution (LTE) carrier aggregation (CA) technology has emerged to satisfy the increasingly higher requirement on data transfer rate. The conventional LTE carrier aggregation technologies are categorized into uplink carrier aggregation (ULCA) and downlink carrier aggregation (DLCA), which correspond to transmission and reception by the mobile terminal respectively. In carrier aggregation (CA), two or more component carriers (CCs) are aggregated together to support a larger transmission bandwidth. Inter-band uplink CA (Inter-band ULCA) refers to that a plurality of different channel carriers of different frequency bands are aggregated simultaneously to perform simultaneous transmission. As signals of different frequency bands are to be transmitted simultaneously, two power amplifiers (PAs) supporting radio frequency (RF) signals of different frequency bands are typically required to operate simultaneously on the radio frequency circuit. In conventional inter-band ULCA circuit designs, two PAs typically operate simultaneously, and two power modules are required to operate simultaneously to power the two PAs separately. Therefore, the power modules for the PAs have a large layout space on the radio frequency printed circuit board, and to a certain extent, unnecessary design expense may result.

SUMMARY

The present disclosure provides an uplink carrier aggregation device and a mobile terminal, to solve the problem in the related art that the power modules for power amplifiers have a large layout space on the radio frequency printed circuit board.

The present disclosure solves the technical problem described above by providing the technical solution as follows.

In a first aspect, the present disclosure provides, in some embodiments, an uplink carrier aggregation device, including: a radio frequency transceiver, at least two power amplifiers, one power-amplifier power module, a control chip, a multiplexer, and an antenna switch. The radio frequency transceiver is connected to the at least two power amplifiers and is configured to transmit modulated and transformed first radio frequency signals of different frequency bands to the corresponding power amplifiers. The at least two power amplifiers are connected separately to the multiplexer and are configured to amplify the received first radio frequency signals of different frequency bands separately to obtain corresponding second radio frequency signals and transmit the second radio frequency signals to the multiplexer. The multiplexer is connected to the antenna switch, and is configured to aggregate the second radio frequency signals transmitted by the at least two power amplifiers and transmit the aggregated second radio frequency signals to the antenna switch. The control chip is connected to the radio frequency transceiver and the power-amplifier power module and is configured to determine supply voltage needed by each power amplifier, determine, based on the maximum value of the supply voltages, a target voltage to be output by the power-amplifier power module, and send a power supply instruction to the power-amplifier power module. The power-amplifier power module is connected to the at least two power amplifiers, and is configured to regulate the target voltage according to the power supply instruction and output the target voltage to the at least two power amplifiers.

In a second aspect, the present disclosure provides, in some embodiments, a mobile terminal including the uplink carrier aggregation device described above.

In embodiments of the present disclosure, one power-amplifier power module supplies power to at least two power amplifiers, so that the power demand of the at least two power amplifiers can be satisfied, while the layout space of the uplink carrier aggregation device on the radio frequency printed circuit board can be reduced, thereby achieving a better layout of the radio frequency printed circuit board and reduced cost.

BRIEF DESCRIPTION OF THE DRAWINGS

In order to explain the technical solutions in the embodiments of the present disclosure more clearly, the drawings required in description of the embodiments of the present disclosure will be briefly described below. Apparently, the drawings in the following description illustrate merely some embodiments of the present disclosure, and other drawings can be obtained based on these drawings without any creative effort by those of ordinary skill in the art.

DETAILED DESCRIPTION

The technical solutions in the embodiments of the present disclosure will be described clearly and thoroughly below with reference to the drawings in the embodiments of the present disclosure. Apparently, the embodiments described are merely some of the embodiments of the present disclosure and not all of them. Based on the embodiments of the present disclosure, any other embodiment obtained by those of ordinary skill in the art without any creative effort shall fall within the scope of the present disclosure.

Figure 1:
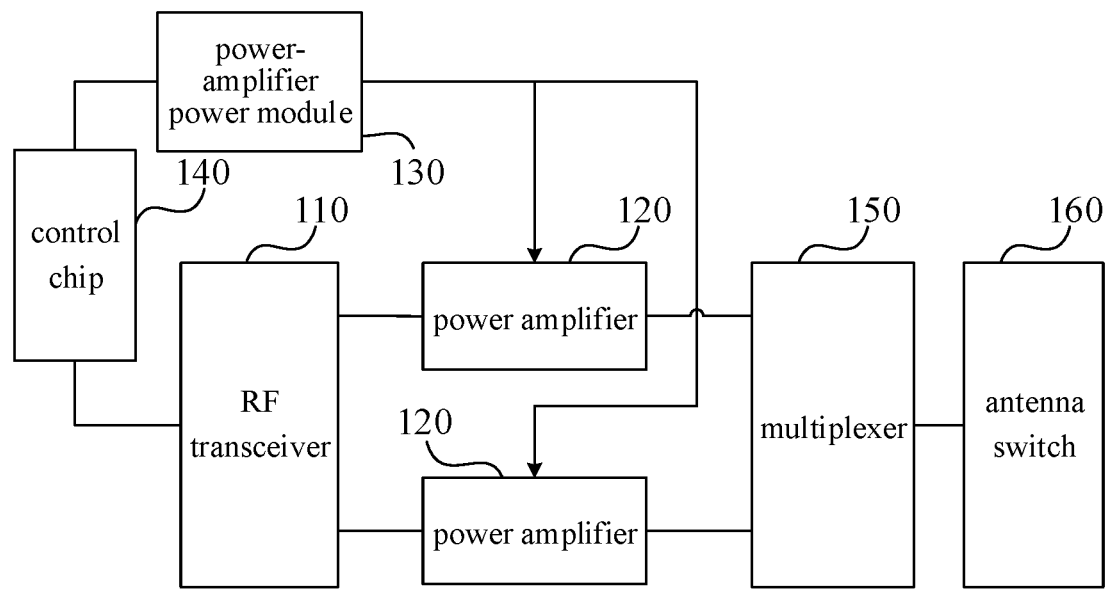
FIG. 1 illustrates a first schematic structural view of an uplink carrier aggregation device according to an embodiment of the present disclosure.

Referring to FIG. 1, a schematic structural view of an uplink carrier aggregation device according to an embodiment of the present disclosure is illustrated.

The embodiment of the present disclosure provides an uplink carrier aggregation device, including a radio frequency transceiver 110, at least two power amplifiers 120, one power-amplifier power module 130, a control chip 140, a multiplexer 150 and an antenna switch 160.

The radio frequency transceiver 110 is connected to the at least two power amplifiers 120 and is configured to transmit modulated and transformed first radio frequency signals of different frequency bands to corresponding power amplifiers 120. The at least two power amplifiers 120 are connected to the multiplexer 150, and are configured to amplify the received first radio frequency signals of different frequency bands separately to obtain corresponding second radio frequency signals and transmit the second radio frequency signals to the multiplexer 150. The multiplexer 150 is connected to the antenna switch 160, and is configured to aggregate the second radio frequency signals transmitted by the at least two power amplifiers 120 and transmit the aggregated second radio frequency signals to the antenna switch 160. The control chip 140 is connected to the radio frequency transceiver 110 and the power-amplifier power module 130, and is configured to determine supply voltage needed by each power amplifier 120, determine, based on the maximum value of the supply voltages, a target voltage to be output by the power-amplifier power module 130, and send a power supply instruction to the power-amplifier power module 130. The power-amplifier power module 130 is connected to the at least two power amplifiers 120, and is configured to regulate the target voltage according to the power supply instruction and output the target voltage to the at least two power amplifiers 120.

In some embodiments of the present disclosure, the radio frequency transceiver 110 receives and performs modulation and transformation on a low-frequency signal transmitted on frequency-multiplied baseband, to obtain at least two first radio frequency (RF) signals of different frequency bands, and sends the first radio frequency signals to corresponding power amplifiers 120. Here, the first radio frequency signals of different frequency bands are transmitted by the radio frequency transceiver 110 to different power amplifiers respectively. The first radio frequency signals of different frequency bands are amplified by the corresponding power amplifiers 120 to obtain corresponding second radio frequency signals that are transmitted to the multiplexer 150, aggregated by the multiplexer 150, and then transmitted to the antenna switch 160, thereby achieving radio frequency signal transmission. In some embodiments of the present disclosure, to enable normal operation of the at least two power amplifiers 120, one power-amplifier power module 130 powers the at least two power amplifiers 120 simultaneously. The control chip 140 determines supply voltage needed by each power amplifier 120 based on the transmit power for the frequency band corresponding to each power amplifier 120, i.e., based on the magnitude of transmit power needed by each power amplifier 120. Here, the supply voltages needed by the different power amplifiers 120 may be the same or different. Then the target voltage to be output by the power-amplifier power module 130 is determined based on the maximum value of the determined supply voltages, and a corresponding power supply instruction is sent to the power-amplifier power module 130. This power supply instruction includes instruction information on the target voltage output from the power-amplifier power module 130, so that the power-amplifier power module 130 regulates the target voltage according to the power supply instruction and outputs voltages of the same magnitude, i.e. target voltage, to the at least two power amplifiers 120 simultaneously, so as to power the at least two power amplifiers 120 simultaneously. In a preferred embodiment, the control chip 140 can be configured to determine the maximum value of the determined supply voltages as the target voltage.

In some embodiments of the present disclosure, one power-amplifier power module 130 powers the at least two power amplifiers 120, so that the power demand of the at least two power amplifiers 120 can be satisfied, while the layout space of the uplink carrier aggregation device on the radio frequency printed circuit board can be reduced, thereby achieving a better layout of the radio frequency printed circuit board and reduced cost.

It is to be noted that, in order to achieve a desirable power saving effect, the uplink carrier aggregation device according to the above embodiment is mainly applicable to the situation where the at least two power amplifiers 120 have good consistency or transmit at low power, that is, a situation where the power amplifiers 120 operate in a linear zone and have good radio frequency performance and consistency, thereby the supply voltages needed by the at least two power amplifiers 120 are similar.

In a preferred embodiment, the uplink carrier aggregation device includes a radio frequency transceiver 110, at least two power amplifiers 120, one power-amplifier power module 130, a control chip 140, a multiplexer 150 and an antenna switch 160. Here, when at least two supply voltages are both lower than a first threshold or when the difference between every two supply voltages of the at least two supply voltages is lower than or equal to a second threshold, the control chip 140 determines, based on the maximum value of the supply voltages, a first target voltage to be output by the power-amplifier power module 130 and sends a power supply instruction to the power-amplifier power module 130, so that the power-amplifier power module 130 outputs the first target voltage to power the at least two power amplifiers 120. As such, in some embodiments of the present disclosure, in a situation where the at least two power amplifiers have good consistency or transmit at low power, one power-amplifier power module can power the at least two power amplifiers simultaneously, so that the power demand of the at least two power amplifiers can be satisfied, while an excessive layout space of the power-amplifier power module on the radio frequency printed circuit board can be avoided, and consequently the layout space of the uplink carrier aggregation device on the radio frequency printed circuit board can be reduced, thereby achieving a better layout of the radio frequency printed circuit board and reduced cost.

Figure 2:
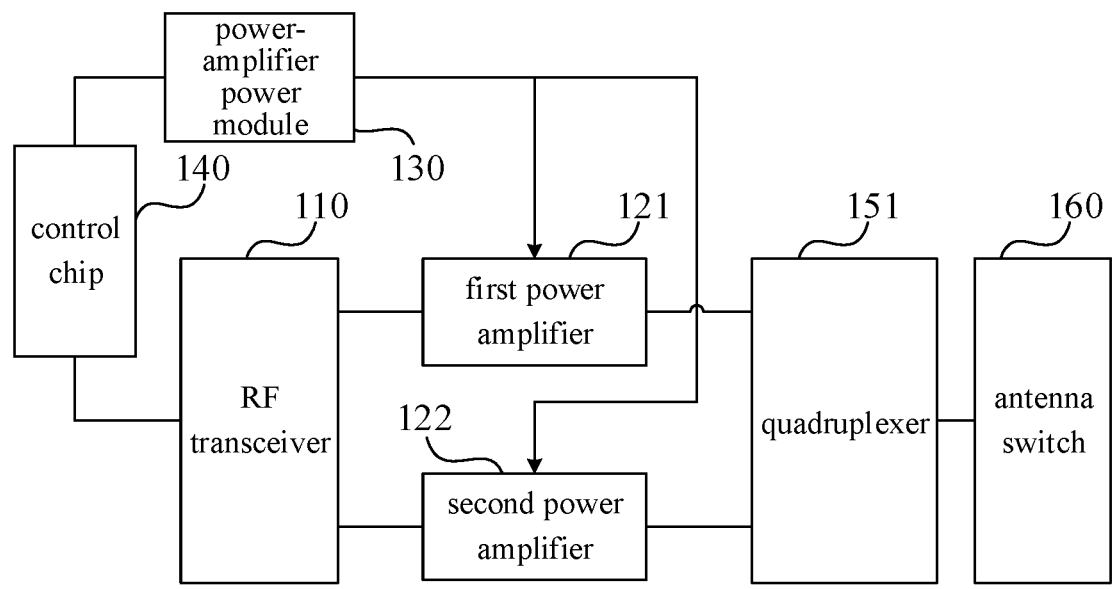
FIG. 2 illustrates a second schematic structural view of an uplink carrier aggregation device according to an embodiment of the present disclosure.

Referring to FIG. 2, in an embodiment of the present disclosure, the at least two power amplifiers 120 may include a first power amplifier 121 and a second power amplifier 122. Specifically, the control chip 140 is configured to, when two supply voltages are both lower than a first threshold or when the difference between the two supply voltages is lower than a second threshold, determine the maximum value of the two supply voltages as a first target voltage to be output by the power-amplifier power module 130 and sends a power supply instruction to the power-amplifier power module 130. The power-amplifier power module 130 regulates the target voltage according to the power supply instruction, and outputs the first target voltage to the first power amplifier 121 and the second power amplifier 122. Preferably, the multiplexer 150 may be a quadruplexer 151.

Figure 3:
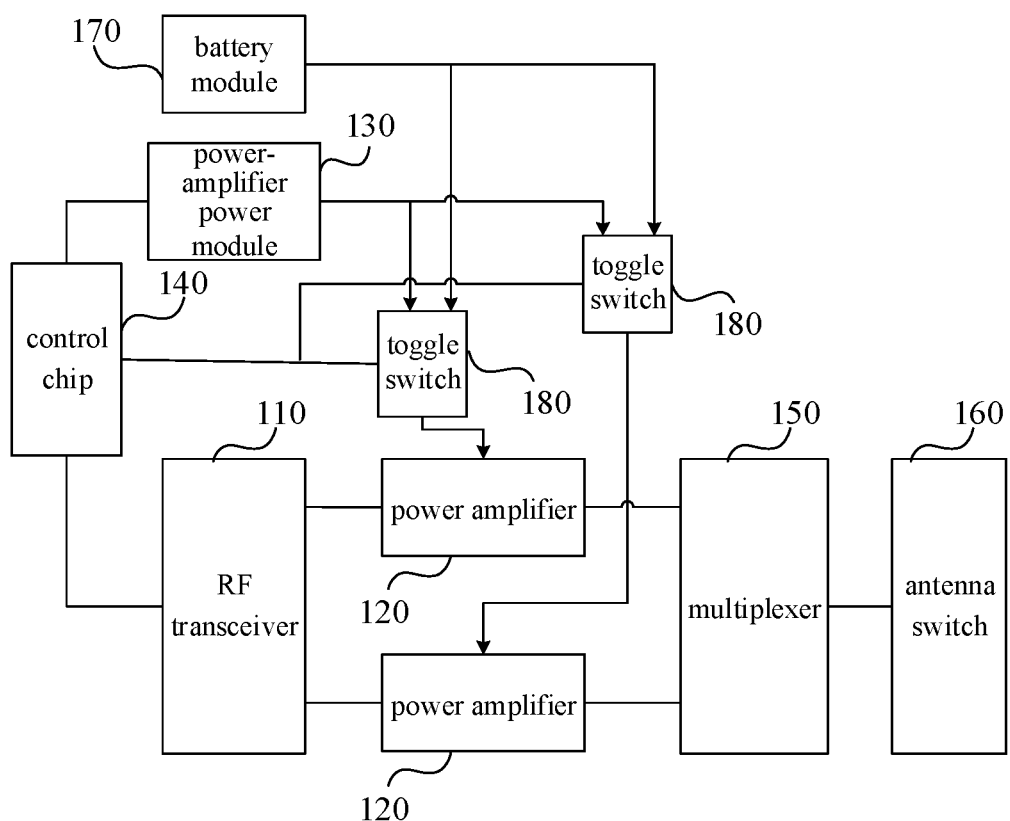
FIG. 3 illustrates a third schematic structural view of an uplink carrier aggregation device according to an embodiment of the present disclosure.

In addition, if the at least two power amplifiers have poor consistency and operate at high power, that is, the power amplifiers 120 operate close to saturation, then there is some difference between the radio frequency performances of the at least two power amplifiers 120, and there is significant difference between the supply voltages needed by the at least two power amplifiers 120. Therefore, referring to FIG. 3, in a preferred embodiment of the present disclosure, the uplink carrier aggregation device may further include a battery module 170 and at least two toggle switches 180.

Each of the toggle switches 180 is communicatively connected to the control chip 140, and each of the toggle switches 180 has a first input end connected to the power-amplifier power module 130, a second input end connected to the battery module 170 and an output end connected correspondingly to one of the power amplifiers 120. In some embodiments of the present disclosure, the quantity of provided toggle switches 180 is the same as the quantity of provided power amplifiers 120. That is, each toggle switch 180 is connected correspondingly to one of the power amplifiers 120. In an example, the toggle switches 180 may be single-pole double-throw switches.

In some embodiments of the present disclosure, when any one of at least two supply voltages is greater than a first threshold and the difference between two supply voltages is greater than a second threshold, the control chip 140 determines, based on a supply voltage, a second target voltage to be output by the power-amplifier power module 130, sends a power supply instruction to the power-amplifier power module 130, and controls the at least two toggle switches 180 to turn on corresponding input ends, so that the battery module 170 powers the power amplifier 120 whose supply voltage is greater than the first threshold, and the power-amplifier power module 130 outputs a second target voltage to power the power amplifier 120 whose supply voltage is lower than or equal to the first threshold. The supply voltage used for determining the second target voltage is the maximum value of the supply voltages lower than or equal to the first threshold. Here, when the control chip 140 determines that any one of at least two supply voltages is greater than the first threshold and the difference between the two supply voltages is greater than the second threshold, that is, in the case that the at least two power amplifiers 120 have poor consistency and operate at high power, the control chip 140 determines, based on the maximum value of the supply voltages lower than or equal to the first threshold, a second target voltage to be output by the power-amplifier power module 130, sends a power supply instruction to the power-amplifier power module 130, and controls the toggle switch 180 connected correspondingly to the power amplifier 120 whose supply voltage is greater than the first threshold to turn on the second input end, so that the battery module 170 powers the power amplifier 120 whose supply voltage is greater than the first threshold, and controls the toggle switch 180 connected correspondingly to the power amplifier 120 whose supply voltage is lower than or equal to the first threshold to turn on the first input end, so that the power-amplifier power module 130 outputs a second target voltage to power the power amplifier 120 whose supply voltage is lower than or equal to the first threshold. In some embodiments of the present disclosure, in the case that the at least two power amplifiers 120 have poor consistency and operate at high power, the battery module 170 of the mobile terminal is directly utilized to power the power amplifier 120 whose supply voltage is greater than the first threshold, and the power-amplifier power module 130 is utilized to power the power amplifier 120 whose supply voltage is lower than or equal to the first threshold, so that the power demand of all the power amplifiers 120 can be satisfied, while an excessive layout space of the power-amplifier power module 130 on the radio frequency printed circuit board can be avoided, and consequently the layout space of the uplink carrier aggregation device on the radio frequency printed circuit board can be reduced, thereby achieving a better layout of the radio frequency printed circuit board and reduced cost.

In some embodiments of the present disclosure, when the at least two supply voltages are both lower than a first threshold, or when the difference between every two supply voltages of the at least two supply voltages is lower than or equal to a second threshold, the control chip 140 determines, based on the maximum value of the supply voltages, a first target voltage to be output by the power-amplifier power module 130, sends a power supply instruction to the power-amplifier power module 130, and controls the at least two toggle switches 180 to turn on the first input ends, so that the power-amplifier power module 130 outputs a first target voltage to power the at least two power amplifiers 120. Here, when the control chip 140 determines that the at least two supply voltages are all lower than the first threshold or the difference between the at least two supply voltages is lower than the second threshold, that is, in the case that the at least two power amplifiers 120 transmit at low power or have good consistency, the control chip 140 determines, based on the maximum value of the supply voltages, the first target voltage to be output, sends a power supply instruction to the power-amplifier power module 130, and controls the at least two toggle switches 180 to turn on the first input ends, so that the power-amplifier power module 130 outputs the first target voltage to power the power amplifiers 120 whose supply voltages are lower than or equal to the first threshold. In this case, the battery module 170 does not power the power amplifiers 120.

Figure 4:
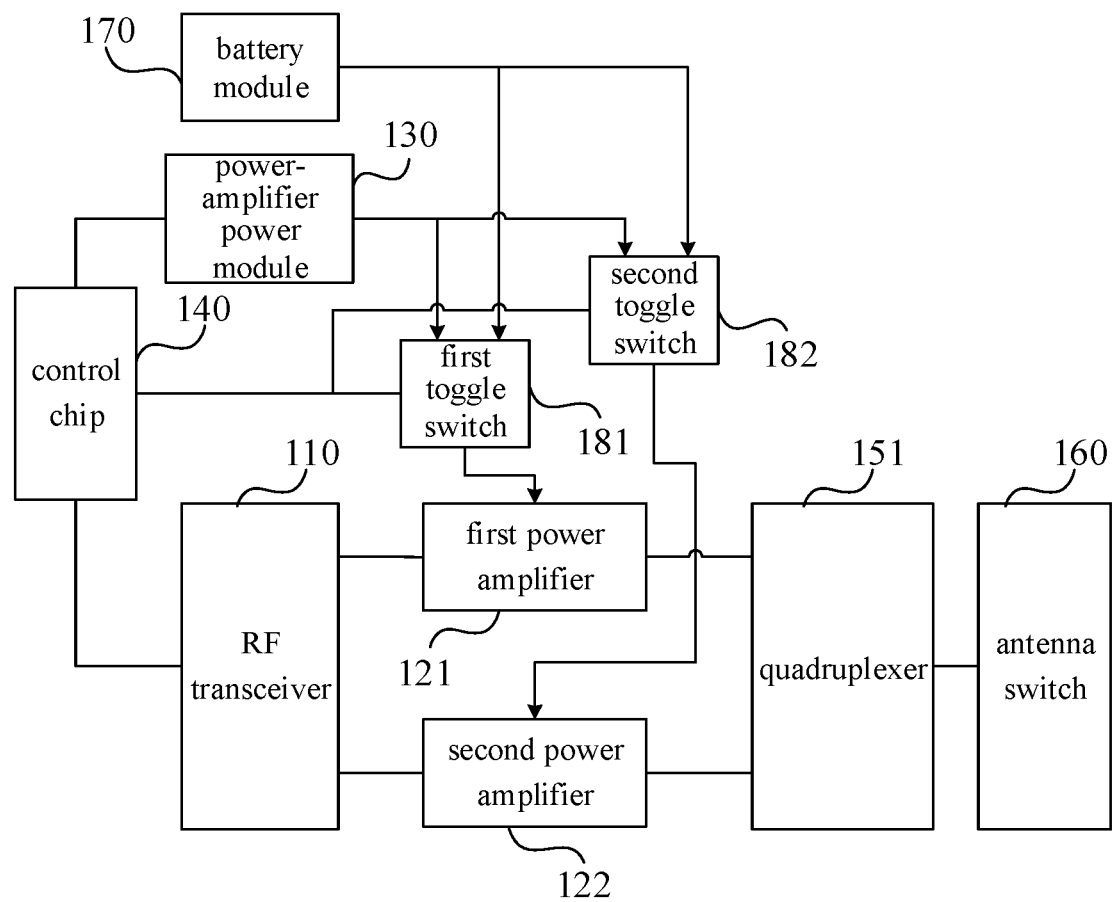
FIG. 4 illustrates a fourth schematic structural view of an uplink carrier aggregation device according to an embodiment of the present disclosure.

Referring to FIG. 4, in a preferred embodiment of the present disclosure, the uplink carrier aggregation device includes a radio frequency transceiver 110, at least two power amplifiers 120, one power-amplifier power module 130, a control chip 140, a multiplexer 150 and an antenna switch 160, and further includes a battery module 170 and at least two toggle switches 180. The at least two power amplifiers 120 may include a first power amplifier 121 and a second power amplifier 122. The control chip 140 is configured to, when two supply voltages are both lower than a first threshold or the difference between the two supply voltages is lower than a second threshold, determine the maximum value of the two supply voltages as a first target voltage to be output by the power-amplifier power module 130, and send a power supply instruction to the power-amplifier power module 130. The power-amplifier power module 130 regulates the target voltage according to the power supply instruction and outputs the first target voltage to the first power amplifier 121 and the second power amplifier 122.

Further, the at least two toggle switches 180 may include a first toggle switch 181 and a second toggle switch 182. An output end of the first toggle switch 181 is connected to the first power amplifier 121, and an output end of the second toggle switch 182 is connected to the second power amplifier 122. When any one of the two supply voltages is greater than the first threshold, and the difference between the two supply voltages is greater than the second threshold, if the supply voltage needed by the first power amplifier is greater than the supply voltage needed by the second power amplifier, then the control chip 140 determines the supply voltage needed by the second power amplifier as a second target voltage to be output by the power-amplifier power module and controls the second input end of the first toggle switch to be conductive and controls the first input end of the second toggle switch to be conductive. When any one of the two supply voltages is greater than the first threshold and the difference between the two supply voltages is greater than the second threshold, if the supply voltage needed by the first power amplifier 121 is lower than the supply voltage needed by the second power amplifier 122, then the control chip 140 determines the supply voltage needed by the first power amplifier 121 as a second target voltage to be output by the power-amplifier power module 130, and controls the first input end of the first toggle switch 181 to be conductive and controls the second input end of the second toggle switch 182 to be conductive.

In some embodiments of the present disclosure, in the case that two power amplifiers have poor consistency and operate at high power, the battery module 170 of the mobile terminal is directly utilized to power the power amplifier that needs a greater supply voltage, and the power-amplifier power module 130 is utilized to power the power amplifier that needs a lower supply voltage, so that the power demand of the two power amplifiers can be satisfied, while an excessive layout space of the power-amplifier power module 130 on the radio frequency printed circuit board can be avoided, and consequently the layout space of the uplink carrier aggregation device on the radio frequency printed circuit board can be reduced, thereby achieving a better layout of the radio frequency printed circuit board and reduced cost. Preferably, the multiplexer 150 may be a quadruplexer 151.

In addition, in a preferred embodiment of the present disclosure, to ensure the power saving performance of the uplink carrier aggregation device, the power-amplifier power module 130 may be an average power tracking module.

In the uplink carrier aggregation device according to some embodiments of the present disclosure, one power-amplifier power module powers at least two power amplifiers, so that the power demand of the at least two power amplifiers can be satisfied, while the layout space of the uplink carrier aggregation device on the radio frequency printed circuit board can be reduced, thereby achieving a better layout of the radio frequency printed circuit board and reduced cost.

The present disclosure further provides, in an embodiment, a mobile terminal including the uplink carrier aggregation device described above.

Since the main body structure of a mobile terminal is known from the related art, and the principle of the structure of the uplink carrier aggregation device is described in detail in the above embodiments, no description of the structure of specific mobile terminal will be given in the embodiment.

In addition, the mobile terminal may be a cellphone, a tablet computer, a laptop computer, a personal digital assistant, or the like.

According to embodiments of the present disclosure, in a mobile terminal having the uplink carrier aggregation device described above, since the uplink carrier aggregation device has a reduced layout space on the radio frequency printed circuit board, the radio frequency printed circuit board can have a better layout and cost is reduced, thereby improving space utilization of the mobile terminal and reducing the design cost of the mobile terminal.

It is to be noted that the terms "have", "include" or any other variant thereof in this specification are intended to cover non-exclusive inclusion, so that a process, method, article or device including a series of elements includes not only those elements, but also other elements not explicitly listed, or elements inherent to such a process, method, article or device. Without further restrictions, the elements defined by the expression "including a . . . " do not exclude the presence of other identical elements in the process, method, article or device including the elements.

It should be understood that, in the description of the specification, reference to the terms "an embodiment", "one embodiment" or "some embodiments" means that a specific feature, structure or characteristic related to an embodiment is included in at least one embodiment or example of the present disclosure. Therefore, the expression "in an embodiment", "in one embodiment" or "in some embodiments" appeared throughout the specification does not necessarily refer to the same embodiment. Furthermore, these specific features, structures or characteristics may be combined in one or more embodiments in any suitable manner.

In the present disclosure, unless otherwise specified and defined, the terms "installed", "interconnected", "connected", "fixed" "arranged" etc. should be understood in a broad sense, for example, they can mean fixed connection, detachable connection or integration; they can be mechanical connection or electrical connection; they can be direct connection or indirect connection via an intermediate medium, or internal communication between two elements or the interaction between two elements. For those of ordinary skill in the art, the specific meanings of the above terms in the present disclosure can be understood according to specific situations.

In addition, in embodiments of the present disclosure, relational terms such as "first" and "second" are intended merely to distinguish one entity or operation from another entity or operation, and do not necessarily require or imply any such actual relationship or order between these entities or operations.

The embodiments of the present disclosure have been described above with reference to the drawings. However, the present disclosure is not limited to the specific implementations described above, which are only illustrative and not restrictive. In light of the present disclosure, those of ordinary skill in the art can make many forms without departing from the gist of the present disclosure and the scope of the claims. These forms shall fall within the scope of the present disclosure.

What is claimed is:

1. An uplink carrier aggregation device, comprising:
a radio frequency transceiver, at least two power amplifiers, one power-amplifier power module, a control chip, a multiplexer, and an antenna switch; wherein
the radio frequency transceiver is connected to the at least two power amplifiers, and is configured to transmit modulated and transformed first radio frequency signals of different frequency bands to the corresponding power amplifiers;
the at least two power amplifiers are connected separately to the multiplexer, and are configured to amplify the received first radio frequency signals of different frequency bands separately to obtain corresponding second radio frequency signals, and transmit the second radio frequency signals to the multiplexer;

the multiplexer is connected to the antenna switch, and is configured to aggregate the second radio frequency signals transmitted by the at least two power amplifiers, and transmit the aggregated second radio frequency signals to the antenna switch;

the control chip is connected to the radio frequency transceiver and the power-amplifier power module, and is configured to determine at least two supply voltages each needed by each of the at least two power amplifiers, determine a target voltage to be output by the power-amplifier power module based on a maximum value of the supply voltages, and send a power supply instruction to the power-amplifier power module; and the power-amplifier power module is connected to the at least two power amplifiers, and is configured to regulate the target voltage according to the power supply instruction and output the target voltage to the at least two power amplifiers;

wherein, when the at least two supply voltages are all lower than a first threshold or when a difference between every two supply voltages of the at least two supply voltages is lower than or equal to a second threshold, the control chip determines, based on the maximum value of the supply voltages, a first target voltage to be output by the power-amplifier power module and sends a power supply instruction to the power-amplifier power module, so that the power-amplifier power module outputs the first target voltage to power the at least two power amplifiers.

2. The uplink carrier aggregation device according to claim 1, wherein the uplink carrier aggregation device further comprises:

a battery module and at least two toggle switches;

each of the toggle switches is communicatively connected to the control chip, and each of the toggle switches has a first input end connected to the power-amplifier power module, a second input end connected to the battery module, and an output end connected correspondingly to one of the power amplifiers;

when any one of the at least two supply voltages is greater than a first threshold and when a difference between two of the supply voltages is greater than a second threshold, the control chip determines, based on a supply voltage, a second target voltage to be output by the power-amplifier power module, sends a power supply instruction to the power-amplifier power module, and controls the at least two toggle switches to turn on the corresponding input ends, so that the battery module powers the power amplifier whose supply voltage is greater than the first threshold, and the power-amplifier power module outputs the second target voltage to power the power amplifier whose supply voltage is lower than or equal to the first threshold, wherein the supply voltage used for determining the second target voltage is a maximum value of the supply voltages lower than or equal to the first threshold.

3. The uplink carrier aggregation device according to claim 2, wherein the power-amplifier power module is an average power tracking module.

4. The uplink carrier aggregation device according to claim 2, wherein the at least two power amplifiers comprise a first power amplifier and a second power amplifier.

5. The uplink carrier aggregation device according to claim 4, wherein the at least two toggle switches comprise a first toggle switch and a second toggle switch;

the output end of the first toggle switch is connected to the first power amplifier, and the output end of the second toggle switch is connected to the second power amplifier;

when any one of two supply voltages needed by the first power amplifier and the second power amplifier is greater than the first threshold, and a difference between the two supply voltages is greater than the second threshold, if the supply voltage needed by the first power amplifier is greater than the supply voltage needed by the second power amplifier, then the control chip determines the supply voltage needed by the second power amplifier as the second target voltage to be output by the power-amplifier power module, and controls the second input end of the first toggle switch to be conductive and controls the first input end of the second toggle switch to be conductive;

when any one of the two supply voltages is greater than the first threshold and the difference between the two supply voltages is greater than the second threshold, if the supply voltage needed by the first power amplifier is lower than the supply voltage needed by the second power amplifier, then the control chip determines the supply voltage needed by the first power amplifier as the second target voltage to be output by the power-amplifier power module, and controls the first input end of the first toggle switch to be conductive and controls the second input end of the second toggle switch to be conductive.

6. The uplink carrier aggregation device according to claim 5, wherein the multiplexer is a quadruplexer.

7. The uplink carrier aggregation device according to claim 1, wherein the uplink carrier aggregation device further comprises:

a battery module and at least two toggle switches;

each of the toggle switches is communicatively connected to the control chip, and each of the toggle switches has a first input end connected to the power-amplifier power module, a second input end connected to the battery module, and an output end connected correspondingly to one of the power amplifiers;

when any one of the at least two supply voltages is greater than a first threshold and when a difference between two of the supply voltages is greater than a second threshold, the control chip determines, based on a supply voltage, a second target voltage to be output by the power-amplifier power module, sends a power supply instruction to the power-amplifier power module, and controls the at least two toggle switches to turn on the corresponding input ends, so that the battery module powers the power amplifier whose supply voltage is greater than the first threshold, and the power-amplifier power module outputs the second target voltage to power the power amplifier whose supply voltage is lower than or equal to the first threshold, wherein the supply voltage used for determining the second target voltage is a maximum value of the supply voltages lower than or equal to the first threshold.

8. A mobile terminal, comprising the uplink carrier aggregation device according to claim 1.

9. A mobile terminal, comprising the uplink carrier aggregation device according to claim 2.

10. A mobile terminal, comprising the uplink carrier aggregation device according to claim 3.

11. A mobile terminal, comprising the uplink carrier aggregation device according to claim 4.

12. A mobile terminal, comprising the uplink carrier aggregation device according to claim 5.

13. A mobile terminal, comprising the uplink carrier aggregation device according to claim 6.

14. A mobile terminal, comprising the uplink carrier aggregation device according to claim 7.

15. The mobile terminal according to claim 8, wherein the mobile terminal is a cellphone or a tablet computer.

\* \* \* \* \*